United States Patent [19]

Ahmed et al.

[11] Patent Number: 4,959,234
[45] Date of Patent: Sep. 25, 1990

[54] METHOD FOR IMPROVING THE TASTE, TEXTURE AND MOUTH FEEL OF A LIQUID DAIRY PRODUCT AND FOR CONCENTRATING SAME

[75] Inventors: Salah H. Ahmed, Elk Grove Village; Anthony J. Luksas, Downers Grove, both of Ill.

[73] Assignee: Electric Power Research Institute, Palo Alto, Calif.

[21] Appl. No.: 272,282

[22] Filed: Nov. 17, 1988

[51] Int. Cl.⁵ .......................... A23C 1/06; A23C 19/05
[52] U.S. Cl. .................................... 426/580; 426/384; 426/492; 426/524; 426/582
[58] Field of Search ............... 426/384, 524, 492, 590, 426/587, 580, 582, 583

[56] References Cited

U.S. PATENT DOCUMENTS

| | | | |
|---|---|---|---|
| 2,602,750 | 7/1952 | Cunningham | 426/384 |
| 2,656,276 | 10/1953 | Toulmin, Jr. | 426/587 |

FOREIGN PATENT DOCUMENTS 2249693 12/1972 France .

*Primary Examiner*—Donald E. Czaja
*Assistant Examiner*—Helen Pratt
*Attorney, Agent, or Firm*—Griffin, Branigan & Butler

[57] ABSTRACT

There is provided a method for concentrating and improving the taste, texture and mouth feel of a liquid dairy product. The liquid dairy product is cooled to a temperature at or below its freezing point. Ice crystals are crystallized from the cooled liquid dairy product to produce a mixture of concentrated product and ice crystals. A portion of the ice crystals is separated from the mixture and heated to form a melt thereof. The mixture is washed with the melt to form a washed mixture of the concentrated product and the ice crystals, and the ice crystals are separated from the washed mixture and the concentrated product is recovered. The amount of ice crystals formed in the crystallizing step is sufficient that the recovered product has a solids content of at least about 20%.

37 Claims, 1 Drawing Sheet

METHOD FOR IMPROVING THE TASTE, TEXTURE AND MOUTH FEEL OF A LIQUID DAIRY PRODUCT AND FOR CONCENTRATING SAME

The present invention relates to a method for improving the taste, texture and mouth feel of a liquid dairy product and for concentrating that liquid dairy product, and more particularly, it relates to a method and a product derived therefrom which utilized freeze concentration for said improvements and concentrating.

BACKGROUND OF THE INVENTION

For various reasons, it is often desired to effect a different solids content of a composition from the solids content normally in that composition. Generally speaking, processes for effecting such different solids content can be broadly classified in two categories, i.e. thermal processes and mass transfer processes. Thermal processes involve heating the composition to a temperature where the non-solids of the composition are either evaporated or distilled. Such processes can alter the solids content of the composition such that the resulting composition is in the form of an increased solids content composition or in the form of a dried composition, where at least a portion of the non-solids content of the composition is removed. Typical thermal processes include heat evaporation, oven drying, and spray drying.

On the other hand, those processes which involve a mass transfer do not normally include a thermal process, or, at least, includes a thermal process with substantially less thermal separation than the typical thermal processes. Among the known mass transfer processes are ultrafiltration, centrifugal separation, and freeze drying.

As examples of the foregoing, milk may be concentrated by vacuum pan evaporation to produce evaporated milk. This process involves heating and is, in part, therefore a thermal process. Soluble coffee can be made from a thermal process, e.g. spray drying, or it can be made from a mass transfer process having a minor thermal process involved, e.g. freeze drying. Tomato paste can be made from a thermal process involving a low temperature spray drying.

As another example of this difficulty in the art, some juices may be effectively concentrated by thermal processes and other juices may not. For example, tomato juice can be effectively concentrated by a thermal process, but orange juice concentrated by a thermal process is of decidedly inferior quality than fresh orange juice. Thus, even with compositions as closely related as the various fruit juices, there is little or no predictability in the art as to which of the many concentration processes will be effective for satisfactorily concentrating a particular juice.

All of these various processes for effecting a different solids content of the composition to be treated have their own special advantages and disadvantages. Many compositions suffer deleterious effects when subjected to a thermal process or to a mass transfer process involving a thermal step. For example, spray dried soluble coffee has a distinctly different taste than freshly brewed coffee, since the thermal spray dry process removes some of the flavor and aroma of the coffee. Freeze drying coffee retains more of the flavor and aroma of brewed coffee, but even in the freeze drying, some loses of flavor and aroma result. On the other hand, tomato paste cannot be satisfactorily produced by a freeze drying process, since tomato juice is unstable under the freezing conditions. Thus, tomato paste is made with a thermal spray dry process, but which process is operated at lower temperatures.

Accordingly, when it is desired to effect a different solids content in known compositions, the art has a wide variety of possible processes from which to choose, with many variations thereof. However, it is usually most unpredictable as to which of these processes, if any, will produce a product of satisfactory characteristics. Under these circumstances, the art has not been able to predict which process, if any, is amenable to effecting a different solids concentration in a particular composition, and the art has been forced to extensive and expensive experimentation to find which process, if any, of all the known various processes and modifications thereof is amenable to satisfactorily effecting such different solids concentration in the composition of interest.

The same problem in the art has existed in connection with effecting different solids concentrations in liquid dairy products. For example, skim milk or whole milk may be concentrated in a thermal process to produce an evaporated milk. However, as is also known, evaporated milk has a taste, texture and mouth feel, either in the concentrated form or in the reconstituted form (reconstituted with water), which is substantially different from the taste, texture and mouth feel of fresh milk. In addition, the functionality of the evaporated milk, as opposed to fresh milk, is changed during that thermal process. For example, evaporated milk cannot be used in certain types of cooking and baking, as opposed to fresh whole milk. As another example, evaporated whole milk, while having fat contents similar to cream, cannot be effectively whipped into a whipped topping, similar to whipped cream.

On the other hand, milk can be subjected to mass transfer concentration processes, such as ultrafiltration, which do not involve a thermal step; but ultrafiltration removes a number of components from the milk, and the product which results therefrom, either in its concentrated form or reconstituted form, is substantially different from milk.

The problem of effecting a different solids content in liquid dairy products is even more difficult than the problem associated with the art in general. Liquid dairy products, such as milk, are emulsions, and, hence, are affected by the various known concentration processes in manners substantially different from other compositions which are solutions and/or suspensions, such as brewed coffee and juices. Further, milk has a delicate balance between the emulsions of the butterfat, the various proteins, and the ash (composed primarily of minerals). In addition, milk contains substantial amounts of lactose, and that lactose cooperates in this delicate balance. As a result thereof, even in known methods of concentrated milk, e.g. in the evaporation process, there is a definite upper limit as to the amount of concentration which can be achieved without disturbing that balance and rendering the product unsatisfactory. Generally speaking, for acceptable products, milk can only be evaporated to the extent that the original volume can be reduced to somewhere only about one half without most undesired effects being experienced. In other words, with, for example, evaporation and starting with a solids content of between about 5 and 10%, the solids content of the evaporated milk can only be about 10 to 20%.

As a result thereof, considerable effort has been extended in the art for finding processes for satisfactorily concentrating liquid dairy products. Heretofore, no such process has been sufficiently satisfactory to yield commercially viable concentrated liquid dairy products, other than the evaporation process. In this regard, concentration should be distinguished from drying, such as spray drying, where satisfactory spray dried non-fat milk solids can be produced.

It would be, therefore, of considerable advantage in the art to provide processes for concentrating liquid dairy products where the processes do not substantially adversely affect the taste, texture and mouth feel of the concentrated liquid dairy product, or the reconstituted form thereof, and which can be conveniently and economically operated.

BRIEF DESCRIPTION OF THE INVENTION

It has now been discovered that liquid dairy products may be satisfactorily and economically concentrated by a freeze concentration process. Freeze concentration is a known mass transfer process and has been successfully commercially used in connection with certain juices, especially orange juice. Also, U.S. Pat. No. 4,316,368 (and its divisional U.S. Pat. No. 4,430,104 and its continuation U.S. Pat. No. 4,459,144) discloses apparatus for freeze concentration, and in the background of the discussion of that apparatus that patent notes that it is sometimes desirable to concentrate aqueous beverages, such as coffee, tea, wine, milk, beer, vinegar and the like. The patent provides no other details as to how or to what extent any particular of these beverages can be freeze concentrated. Thus, the art has neither recognized that liquid dairy products can be satisfactorily concentrated by freeze concentration nor recognized that freeze concentration thereof provides unexpected improvements in the liquid dairy products.

It has now been discovered that a freeze concentration process not only can be used to satisfactorily concentrate a liquid dairy product, but quite unexpectedly it has been discovered that the freeze concentration process resulted in improved taste, texture and mouth feel of the liquid dairy product, either in the concentrated form or in the reconstituted form thereof.

As is known, the general process of freeze concentrating is that of cooling the composition to form ice crystals of the non-solids portion of the composition, separating a portion of those crystals, heating the separated crystals to form a melt thereof, washing the mixture of concentrated product and the crystals with that melt for effecting a mass transfer of certain components in the mixture, separating the remaining ice crystals from the mixture and recovering the concentrated product.

It has now been discovered that if such known freeze concentration process is carried out with a liquid dairy product to the extent that the solids content of the recovered concentrated product is at least 20%, then the concentrated product is not only stable and has not deteriorated in taste, texture and mouth feel, but, indeed, has a very substantial improvement in taste, texture and mouth feel, either in the concentrated form or in the reconstituted form.

Thus, briefly stated, the present invention provides a method for improving the taste, texture and mouth feel of the liquid dairy product and for concentrating the liquid dairy product. The process involves that of cooling the liquid dairy product to a temperature at or below its freezing point. Ice crystals are crystallized from the cooled liquid dairy product to produce a mixture of concentrated product and ice crystals. A portion of the ice crystals is separated from the mixture and heated to form a melt of those separated crystals. The remaining mixture of the concentrated product and ice crystals is washed with that melt to effect further mass transfer, and the remaining ice crystals in that washed mixture are separated therefrom so as to recover the concentrated product. In carrying out the process, however, the amount of ice crystals formed in the crystallization step must be sufficient that the recovered product has a solids content of at least about 20%.

The present invention also provides a freeze concentrated product, derived from a liquid dairy product, wherein the solids content of the product is at least about 20%.

BRIEF DESCRIPTION OF THE DRAWING

The FIGURE is a diagrammatic illustration of apparatus suitable for carrying out the present process.

DETAILED DESCRIPTION OF THE INVENTION

Figure 1:
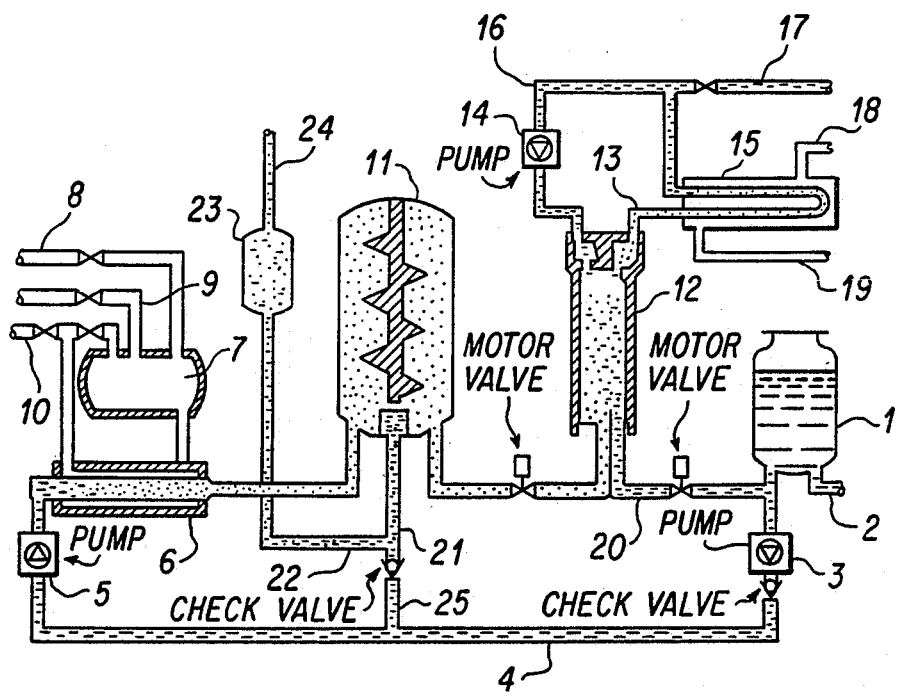

The apparatus for carrying out the present process is a known and conventional apparatus. Thus, the apparatus will be described only in summary form, for sake of conciseness. As shown in the FIGURE, the apparatus comprises a feed tank 1 for holding the liquid dairy product to be fed to the process. The liquid dairy product is fed to tank 1 through inlet 2 until the amount of feed to the process, desired to be processed, is contained in tank 1. A feed pump 3 pumps the feed through line 4 and through circulating pump 5 to a scraped surface heat exchanger 6 which is supplied with refrigerant from a surge drum 7 which has a suction 8 for the refrigerant gas, a supply 9 of the refrigerant gas, and a refrigerant gas return 10, which is coupled with a refrigerant compressor (not shown). The liquid dairy product to be concentrated is cooled in heat exchanger 6 to a temperature about or below its freezing point, e.g. to a temperature 1° to 4° C. below the freezing point. At this time, ice crystals form in the liquid dairy product and the mixture of ice crystals and concentrated liquid dairy product (concentrated by virtue of the ice crystals removing liquid from the liquid/solids mixture) is passed to a recrystallizer 11 where those crystals rearrange in shape and size, in known manners. In the recrystallizer, the size and distribution of sizes of crystals are rearranged to favor increased concentration of the liquid dairy product. The operation of such recrystallizers is known in the art and need not be described herein. After sufficient crystallization has taken place, so that the resulting recovered product will have a solids content of at least 20%, as described above, the mixture of concentrated product and ice crystals is passed to an ice scraper 12, which mechanically works the crystals and causes separation thereof. Some of the separated crystals are passed through line 13 by pump 14 to a heat exchanger 15, where that portion of the crystals is melted to form a melt thereof. That melt is then returned to ice scraper 12 through line 16 and is used to wash the mixture of concentrated product and crystals so as to effect additional mass transfer. Again, the operation of the ice scraper, along with the wash of the mixture of product and crystals, is known to the art and need not be described herein in detail. As the process continues, some of the melt is discharged from the system through outlet 17, and heat exchanger 15 is usually connected by line 18 and line 19 to a heat exchanger (not shown) for precooling the feed entering tank 1, in order to maximize the economies of heat transfer in the process.

In practice, usually the washed mixture from ice scraper 12 is recirculated, through line 20, to be mixed with fresh incoming feed and returned to the process through line 4. This recirculation is continued until the concentrated product in recrystallizer 11 reaches the desired degree of concentration. In this invention, this recirculation must be carried out until the concentration of the concentrated product is such that the recovered concentrated product will have a solids content of at least 20%.

At this point, concentrated product is removed from the recrystallizer 11 through lines 21 and 22 to expansion vessel 23 and recovered via line 24.

As a further option in the process for effecting the required degree of concentration, a portion of the concentrated product may be recycled to the process through line 25. The concentrated product, having the concentration required, i.e. the present at least 20% solids, is then removed from the process via line 24.

The apparatus, of course, has appropriate valving and controls, shown by symbols in the drawings, for effecting the operations and options thereof, as described above.

Also, as noted above, the apparatus is known to the art, and the operation of such apparatus is known to the art, and need not be described herein in detail. It is, however, of substantial importance to the invention that the apparatus be operated in a manner and to an extent such that the recovered concentrated product has a solids content of at least 20%.

In this latter regard, it has been discovered that only when the solids content reaches about 20% does the present improvement in the taste, texture and mouth feel commence. However, that improvement in taste, texture and mouth feel is significantly increased when the solids content is at least about 30% and more preferably about 35%. However, on the other hand, it has been found that if the solids content is increased up to about 50%, instability in the product may commence. Thus, the solids content should be only up to about 50%, and more preferably only up to about 45%, in order to ensure that such instability does not result.

It has been found that the process is amenable to a wide variety of liquid dairy products. The liquid dairy products may include skim milk, reduced fat milk (1%, 2% and 3%, etc.), whole milk, sweet whey, acid whey, and even reconstituted non-fat milk solids. The process may also be practiced in connection with sweet and acid whey permeate produced by known ultrafiltration processes of such whey. Indeed, it may be practiced in regard to the whey protein concentrate recovered from such known ultrafiltration processes. However, the process is most valuable when practiced in connection with skim milk, reduced fat milk and whole milk, and these are the preferred embodiments of the invention.

Turning now to the improvements in taste, texture and mouth feel, when the recovered concentrated product is reconstituted with water to approximately the original solids content of the liquid dairy product fed to the process, the taste, texture and mouth feel of the reconstituted product are considerably improved from that of the liquid dairy product. For example, when the concentrated product is derived from skim milk and the concentrated product is reconstituted with water to produce substantially the same solids content as that of the skim milk originally fed to the process, the taste is much more similar to reduced fat milk, e.g. 2% milk, than to skim milk. The texture is far more creamy than skim milk, e.g. the texture is similar to whole milk. The mouth feel is not the watery mouth feel of skim milk, but has a mouth feel similar to reduced fat milk, e.g. 2% fat milk. As can be easily appreciated, this provides a very substantial advantage to the art, in that essentially all of the nutrients of skim milk are retained in the present product, and the present product has the taste, texture and mouth feel of at least reduced fat milk, but without having the butterfat therein. This is exceptionally important to those who are required to limit their intake of butterfat, but where the taste, texture and mouth feel of skim milk, to achieve that result, are objectionable.

Further, it has been found that the ice crystals formed during the process contain substantial amounts of lactose and, correspondingly, the recovered product has a reduced lactose content, e.g. from 5% up to 50% or more reduction. Certain people have an intolerance to lactose, and the present process and product provides a substantially reduced lactose content, as opposed to the liquid dairy product, e.g. skim milk, fed to the process. Thus, those persons who are sensitive to lactose may well use the present product with impunity, while at the same time the present product provides to those users an improved taste, texture and mouth feel, as compared with, for example, skim milk.

By operating the process, described above, and the options, briefly described above and well known to the art, the recovered concentrated product may have a reduced lactose content which can be at least 20% or even 50% less than the lactose content of the liquid dairy product fed to the process. Indeed, within the operation of the process, lactose crystals will form and settle to the bottom of the recrystallizer and the crystals can be separated from the liquid in the recrystallizer, e.g. by a centrifuge, so that the reduced lactose content of the concentrated product is at least 30% or even 40% or even 60% less than the lactose content of the liquid dairy product fed to the process, and with the recirculations described above even at least 80% less, and even at least 90% less. The lactose crystal can be recovered, and the recovered lactose is an exceptionally pure form thereof. The very pure lactose is, therefore, very useful in pharmaceutical preparations. Conventional processes for producing pharmaceutical grade lactose are quite expensive to operate, and the present process can produce such lactose as a byproduct and at very little additional cost.

The product also exhibits some very unusual and quite unexpected properties. For example, skim milk concentrated as described above is whipable by simply beating with a conventional beater, e.g. a MIXMASTER, to produce a whipped topping, especially when mixed with conventional dairy emulsifying agents such as the glycerides. This is, of course, quite opposite to evaporated skim milk or even evaporated whole milk.

Also, as opposed to whole milk or skim milk, or the like, the present concentrated product may be frozen and that frozen product is storage stable for at least one month, without any substantial deterioration of taste, texture and mouth feel upon reconstitution, and can be storage stable for as long as about six months under freezing conditions. Thus, the present product provides an easy-to-store and convenient form of milk which may be kept in the consumer's freezer and used as needed. The ability for the present product to be satisfactorily frozen and reconstituted, as opposed to skim milk, whole milk, etc., is not understood, but it is believed that it is a result of both the separation of the lactose and the rearrangement of the components of the concentrate (in emulsion form), especially the rearrangement of the relation between the protein, ash and any fat.

Even further, the present concentrated product can be spray dried into a powdered form, and the reconstituted form thereof is substantially superior to spray dried milk or non-fat milk solids, in terms of taste, texture and mouth feel. The spray drying, however, does introduce some off flavors, but those off flavors are substantially less than the off flavors which occur in commercially spray dried milk or skim milk, and the present spray dried form of the concentrated product is far more acceptable from a taste, texture and mouth feel point of view than commercially available spray dried products of the same liquid dairy product.

As will also be appreciated, the product concentrate will have a greatly reduced water content (including lactose) as compared with the liquid dairy product fed to the process. The cost of shipping a liquid dairy product includes the unnecessary cost of shipping the water associated therewith. For example, in cheese manufacture, whole milk is transported long distances and the cost of that transportation is very significant. Since the water associated with the whole milk is simply an unwanted by-product in cheese manufacture (exits the process in the form of whey, which constitutes a disposal problem), the present concentrated product may, instead, be shipped at a considerably reduced transportation cost and used in cheese manufacture without reconstitution. This is a substantial savings in cheese production, both in terms of the transportation cost and in terms of disposal of whey. This is, indeed, a very important aspect of the present invention, where the concentrated product may be used as a feed for cheese making.

The invention will now be illustrated by way of the following examples, and in the examples, as well as in the specification and claims, all parts, proportions and amounts are by weight, and all temperatures are in Centigrade, unless otherwise indicated.

EXAMPLE 1

Approximately 720 gallons of fresh skim milk (about 9.3% solids) was pasteurized in a HTST (high temperature-short time) pasteurizer and fed to a GRENCO, pilot plant style, freeze concentrator, having an arrangement and operation essentially as described in connection with the FIGURE. At steady state operation the melt from the process had about 0.04% solids, a BOD of about 58, about 0.01% protein, 0.05% lactose and 0.04% ash, which is quite acceptable for usual disposal. The recovered concentrated product had about 32% solids, i.e. about 0.4% fat, 14.7% proteins, 2% ash and 15% lactose. The initial freezing point of the feed was about $-1.5°$ C. and dropped as the concentration of the product increased with operation of the process to about $-3.5°$ C. (at about 3.8° BRIX). The viscosity of the concentrate went from about 5 centipoise for the feed to about 15 centipoise at 20% total solids, to about 75 centipoise at 30% total solids and became asentopic at about 32% total solids.

The concentrated product was reconstituted with water to the original solids content of the feed and a taste panel conducted a blind evaluation of the reconstituted product in comparison with fresh skim milk. The table below provides the results of that taste panel where the scale is 1 to 5, with 5 being excellent.

| SENSORY PROPERTY | Skim Milk | Present Product |
|---|---|---|
| Taste | 3 | 5 |
| Color | 3 | 4 |
| Aroma | 3 | 3 |
| Mouth Feel and Texture | 3 | 4 |
| Sediment | 3 | 3 |

EXAMPLE 2

The procedure of Example 1 was repeated with whole milk, and the product, after reconstitution, was compared with fresh whole milk by a blind taste panel, as described in Example 1. The results were as follows:

| SENSORY PROPERTY | Whole Milk | Present Product |
|---|---|---|
| Taste | 3 | 4 |
| Color | 3 | 3 |
| Aroma | 3 | 3 |
| Mouth Feel and Texture | 3 | 5 |
| Sediment | 3 | 3 |

As a further control, reconstituted evaporated whole milk was evaluated for the same sensory properties and rated a 1 in each property, except for a 2 in sediment.

EXAMPLE 3

The products of Examples 1 and 2 were frozen and stored at freezing temperatures for one month. As controls, fresh skim milk and whole milk were likewise frozen and stored. After thawing and reconstituting, the products of Examples 1 and 2 were compared by a taste panel with the thawed skim milk and whole milk. The scores of taste, color, aroma, mouth feel and texture and sediment, respectively, were as follows: skim milk - 1, 2, 1, 1 and 1; reconstituted product of Example 1 (skim milk) - 3, 3, 2, 3 and 3; whole milk - 2, 1, 1, 1 and 1; reconstituted product of Example 2 (whole milk) - 4, 3, 2, 3 and 2.

Accordingly, it can be seen from the foregoing, that the present invention provides a very substantial advance in the art. It will also be appreciated that the present invention is amenable to apparent variations to those skilled in the art, and it is intended that those variations be embraced by the spirit and scope of the annexed claims.

What is claimed is:

1. A method for improving the taste, texture and mouth feel of a liquid dairy product and for concentrating the liquid dairy product, comprising:
   (1) disposing the liquid dairy product in a scraped surface heat exchanger and cooling the liquid dairy product therein to a temperature at or below its freezing point to provide a cooled liquid dairy product;
   (2) passing the cooled liquid dairy product to a recrystallizer and crystallizing ice crystals from said cooled liquid dairy product to produce a mixture of concentrated product and ice crystals;

(3) passing the concentrated product and ice crystals to a vertically disposed, vertically elongated ice scrapper wherein the ice crystals are mechanically worked and separating a portion of said ice crystals from the upper part of the ice scrapper and from said mixture in said ice scrapper and heating the separated ice crystals to form a melt thereof;

(4) passing the melt into the ice scrapper near the upper part thereof and washing the said mixture in said ice scrapper with the said melt to form a washed mixture of the concentrated product and the ice crystals in the said ice scrapper;

(5) separating the remaining ice crystals from the washed mixture and recovering the concentrated product; and wherein the amount of ice crystals formed in the crystallizing step is sufficient that the recovered product has a solids content of at least about 20.

2. The process of claim 1 wherein the said solids content is at least about 30%.

3. The process of claim 2 wherein the solids content is at least about 35%.

4. The process of claim 1 wherein the solids content is up to about 50%.

5. The process of claim 4 wherein the solids content is up to about 45%.

6. The process of claim 1 wherein the liquid dairy product is selected from the group consisting of skim milk, reduced fat milk, whole milk, sweet whey, acid whey and reconstituted non-fat milk solids.

7. The process of claim 6 wherein the liquid dairy product is selected from the group consisting of skim milk, reduced fat milk and whole milk.

8. The process of claim 1 wherein the recovered concentrated product is reconstituted with water to form a reconstituted product.

9. The process of claim 7 wherein the recovered concentrate is reconstituted with water to form a reconstituted product.

10. The process of claim 8 wherein the reconstitution is such that the reconstituted product has substantially the same solids content as that of the liquid dairy product fed to the process.

11. The process of claim 9 wherein the reconstitution is such that the reconstituted product has substantially the same solids content as that of the liquid dairy product fed to the process.

12. The process of claim 1 wherein the said concentrate contains substantial amounts of lactose and the lactose is removed from the concentrate to provide the recovered product with a substantially reduced lactose content.

13. The process of claim 12 wherein the recovered product has a reduced lactose content which is at least 20% less than the lactose content of the liquid dairy product fed to the process.

14. The process of claim 12 wherein the reduced lactose content is at least 30% less than the lactose content of the liquid dairy product fed to the process.

15. The process of claim 14 wherein the reduced lactose content is at least 40% less than the lactose content of the liquid dairy product fed to the process.

16. The process of claim 15 wherein the reduced lactose content is at least 60% less than the lactose content of the liquid dairy product fed to the process.

17. The process of claim 1 wherein the recovered product is beaten with a beater to form a whipped topping.

18. The process of claim 1 wherein the recovered product is frozen and is storage stable in that frozen form.

19. The process of claim 1 wherein the recovered product is spray dried to a powdered form.

20. The process of claim 1 wherein the concentrated product is used as the feed for cheese making.

21. The freeze concentrated recovered product of claim 1, derived from the said liquid dairy product, wherein the solids content of the recovered product is at least about 20%.

22. The product of claim 21 wherein the solids content is at least about 30%.

23. The product of claim 22 wherein the solids content is at least about 35%.

24. The product of claim 21 wherein the solids content is up to about 50%.

25. The product of claim 24 wherein the solids content is up to about 45%.

26. The product of claim 21 wherein the product is derived from a liquid dairy product selected from the group consisting of skim milk, reduced fat milk, whole milk, sweet whey, acid whey and reconstituted non-fat milk solids.

27. The product of claim 26 wherein the liquid dairy product is selected from the group consisting of skim milk, reduced fat milk and whole milk.

28. The product of claim 21 wherein the recovered product is in a reconstituted form, said reconstitution being with water.

29. The product of claim 28 wherein the solids content of the reconstituted form is substantially the same as the solids content of the liquid dairy product.

30. The product of claim 21 wherein the recovered product has a lactose content which is substantially reduced from the lactose content of the liquid dairy product.

31. The product of claim 30 wherein there is at least a 20% reduction in lactose content.

32. The product of claim 31 wherein there is at least a 30% reduction in lactose content.

33. The product of claim 32 wherein there is at least a 40% reduction in lactose content.

34. The product of claim 33 wherein there is at least a 60% reduction in lactose content.

35. The product of claim 21 in a frozen and stable form.

36. The product of claim 21 in a whipped form.

37. The product of claim 21 in a spray dried form.

* * * * *